US010520937B2

(12) United States Patent
Rasheed et al.

(10) Patent No.: US 10,520,937 B2
(45) Date of Patent: Dec. 31, 2019

(54) SENSING AND COMPUTING CONTROL SYSTEM FOR SHAPING PRECISE TEMPORAL PHYSICAL STATES

(71) Applicant: General Electric Company, Schenectady, NY (US)

(72) Inventors: Adam Rasheed, Niskayuna, NY (US); David Toledano, Niskayuna, NY (US); Christopher Johnson, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 100 days.

(21) Appl. No.: 15/429,515

(22) Filed: Feb. 10, 2017

(65) Prior Publication Data

US 2018/0231962 A1 Aug. 16, 2018

(51) Int. Cl.
*G05B 23/02* (2006.01)

(52) U.S. Cl.
CPC .......... *G05B 23/0283* (2013.01); *Y02P 90/02* (2015.11); *Y02P 90/86* (2015.11)

(58) Field of Classification Search
CPC .... G05B 19/41885; G05B 2219/31015; G05B 23/0283; G05B 23/0254; G05B 17/02; E21B 44/00; G06F 17/5009
(Continued)

(56) References Cited

U.S. PATENT DOCUMENTS 6,314,361 B1 11/2001 Yu et al.
7,689,329 B2 3/2010 Avery et al.
(Continued)

FOREIGN PATENT DOCUMENTS

WO WO2018106255 A1 * 6/2018

OTHER PUBLICATIONS

Gupta, Payal et al., "Simulation Model for Aircraft Line Maintenance Planning", 2003 Proceedings Annual Reliability and Maintainability Symposium, 2003, (pp. 387-391, 5 total pages).
(Continued)

*Primary Examiner* — Rocio Del Mar Perez-Velez
*Assistant Examiner* — Alicia M. Choi
(74) *Attorney, Agent, or Firm* — Buckley, Maschoff & Talwalkar LLC

(57) ABSTRACT

According to some embodiments, system and methods are provided, comprising an installed product, including a plurality of components; a computer programmed with a damage metric model for the installed product, the damage metric model for providing an estimate of an extent of damage on one or more components; the computer programmed with a dynamic process control model for providing a dynamic response of the installed product with respect to its one or more operating parameters; the computer further programmed with a true-up model for providing a control action to reduce an uncertainty of the estimate provided by the damage metric model; the computer including a processor and a memory in communication with the processor, the memory storing the damage metric model and the true-up model; the memory storing additional program instructions, the processor operative with the additional program instructions to perform functions as follows: receiving an estimate output of the damage metric model, wherein the output includes the estimate of the extent of damage on the one or more components; generating, via the dynamic process control model, an operating response of the installed product to the received estimate output; in response to receipt of the estimate output, executing the true-up model; and generating, via execution of the true-up model, the plan to reduce uncertainty of the estimate output. Numerous other aspects are provided.

16 Claims, 8 Drawing Sheets

(58) Field of Classification Search
USPC .......................................................... 700/29
See application file for complete search history.

(56) References Cited

U.S. PATENT DOCUMENTS

| | | | |
|---|---|---|---|
| 7,860,618 B2 | 12/2010 | Brandstetter et al. | |
| 8,560,376 B2 | 10/2013 | Lienhardt | |
| 8,600,917 B1* | 12/2013 | Schimert | G06N 5/00 |
| | | | 706/14 |
| 9,251,502 B2 | 2/2016 | Schoonveld | |
| 2002/0148646 A1* | 10/2002 | Schultz | E21B 12/02 |
| | | | 175/40 |
| 2008/0208487 A1* | 8/2008 | Goebel | G06Q 10/04 |
| | | | 702/34 |
| 2009/0083050 A1 | 3/2009 | Eltman et al. | |
| 2012/0166249 A1 | 6/2012 | Jackson | |
| 2012/0271824 A1* | 10/2012 | Goldfine | G01N 27/90 |
| | | | 707/736 |
| 2012/0316833 A1* | 12/2012 | Lovick | G06F 17/18 |
| | | | 702/179 |
| 2013/0046517 A1* | 2/2013 | Baym | G06F 17/5009 |
| | | | 703/2 |
| 2014/0284103 A1* | 9/2014 | Niina | E21B 47/00 |
| | | | 175/24 |
| 2015/0218914 A1* | 8/2015 | Marx | E21B 44/00 |
| | | | 175/24 |
| 2016/0290118 A1* | 10/2016 | Xue | E21B 47/00 |
| 2016/0312552 A1* | 10/2016 | Early | G05B 13/041 |

OTHER PUBLICATIONS

Cook, Jonathan "Reducing Military Helicopter Maintenance Through Prognostics", IEEE Aerospace Conference, Mar. 3-10, 2007, (pp. 1-7, 7 total pages).

Papakostas, N. et al., "An Approach to Operational Aircraft Maintenance Planning", Decision Support Systems, vol. 48, Issue:4, Mar. 2010, (pp. 604-612, 9 total pages).

* cited by examiner

DAMAGE ANALYTIC "TRUED-UP" AT $t_{PRESENT}$, RESULTING IN NARROWER UNCERTAINTY IN $t_{THRESHOLD}$

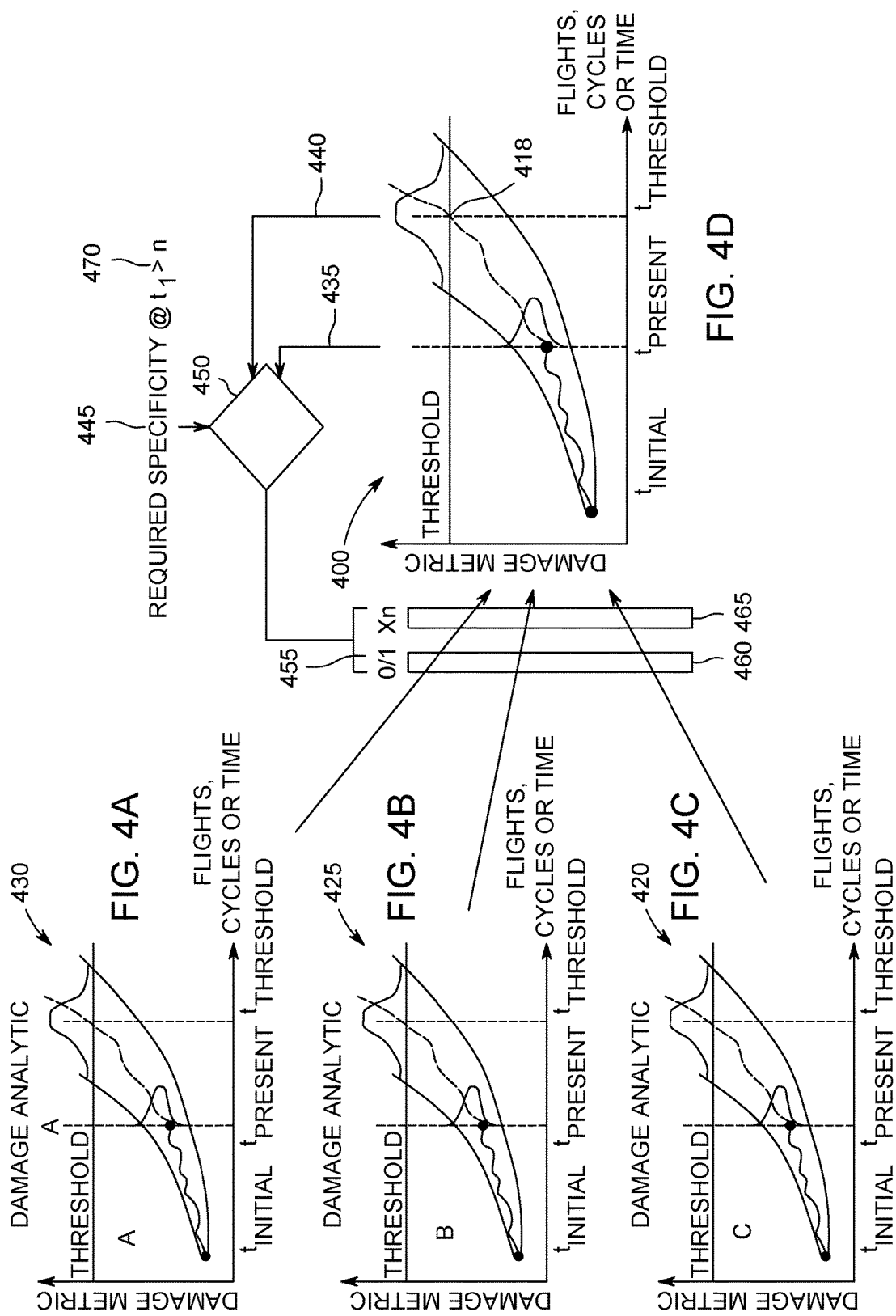

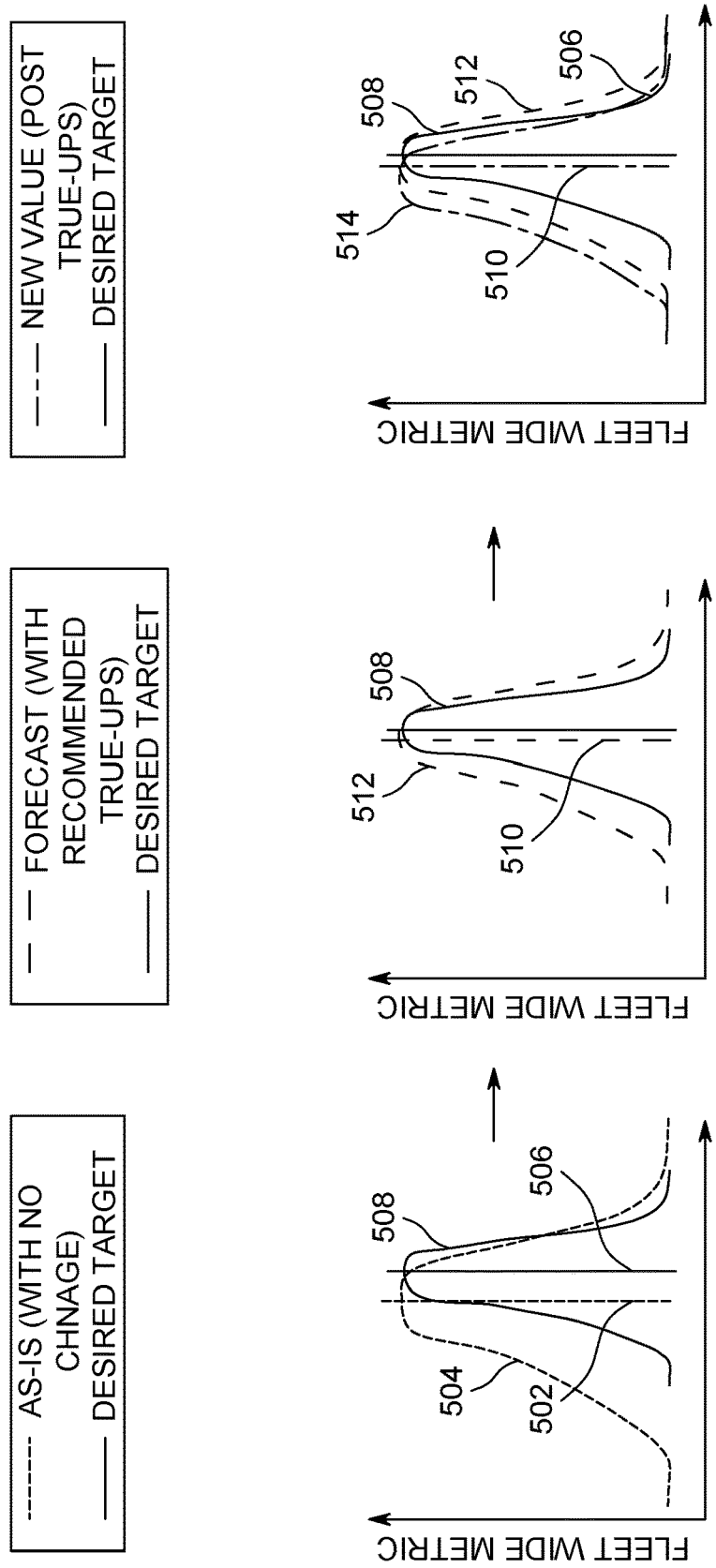

SENSING AND COMPUTING CONTROL SYSTEM FOR SHAPING PRECISE TEMPORAL PHYSICAL STATES

BACKGROUND

Industrial equipment or assets, generally, are engineered to perform particular tasks as part of industrial processes. For example, industrial assets can include, among other things and without limitation, manufacturing equipment on a production line, aircraft engines, wind turbines that generate electricity on a wind farm, power plants, locomotives, healthcare or imaging devices (e.g., X-ray or MRI systems) for use in patient care facilities, or drilling equipment for use in mining operations. The design and implementation of these assets often takes into account both the physics of the task at hand, as well as the environment in which such assets are configured to operate and the specific operating control these systems are assigned to.

Low-level software and hardware-based controllers have long been used to drive industrial assets. However, the rise of inexpensive cloud computing, increasing sensor capabilities, and decreasing sensor costs, as well as the proliferation of mobile technologies and cloud computing with services oriented architectures have created opportunities for creating novel industrial assets with improved sensing and control technology that are capable of transmitting data that can then be transmitted to a network. As a consequence, there are new opportunities to enhance the performance value of complex industrial asset based systems using integrated industrial-focused hardware and computing control software.

Assets, including the asset components, typically acquire damage during assigned operations. For industries, a challenge is assessing a health status (e.g., state of damage) of an asset at a one or more points in time, and then scheduling appropriate maintenance or dynamically changing the duty assignment or maintenance to avoid unexpected failures or reduction in operational utility. Conventionally, a mix of sensors and analytics in condition-based and prognostic maintenance programs provide a simple threshold level for a specific asset such as an engine component, without any regard to system-level impacts and have no means to control the physical states of the assets or the processes which use them.

It would be desirable to provide systems and methods to improve optimized maintenance and operational control interventions of an integrated sensing and control industrial asset.

BRIEF DESCRIPTION

According to some embodiments, a system includes providing an installed product, including a plurality of components; a computer programmed with a damage metric model for the installed product, the damage metric model for providing an estimate of an extent of damage on one or more components; the computer programmed with a dynamic process control model for providing the dynamic response of the physical system with respect to its one or more operating parameters; the computer further programmed with a true-up model for providing a control action to reduce an uncertainty of the estimate provided by the damage metric model; the computer including a processor and a memory in communication with the processor, the memory storing the damage metric model and the true-up model; the memory storing additional program instructions, the processor operative with the additional program instructions to perform functions as follows: receiving an estimate output of the damage metric model, wherein the output includes the estimate of the extent of damage on the one or more components; generating, via the dynamic process control model, an operating response of the installed product to the received estimate output; in response to receipt of the estimate output, executing the true-up model; and generating, via execution of the true-up model, the control action to reduce uncertainty of the estimate output.

According to some embodiments, a method includes receiving, at a damage metric model, state data associated with one or more components of an installed product; generating, via the damage metric model, an estimate output of an extent of damage the on one or more components; receiving the estimate output at a damage module; generating, via a dynamic process control model, an operating response of the installed product to the received estimate output; and in response to receiving the estimate output, executing a true-up model to generate a control action to reduce uncertainty of the estimate output.

According to some embodiments, a non-transitory, computer-readable medium storing instructions that, when executed by a computer processor, cause the computer processor to perform a method comprising: receiving, at a damage metric model, state data associated with one or more components of an installed product; generating, via the damage metric model, an estimate output of an extent of damage on the one or more components; receiving the estimate output at a damage module; generating, via the dynamic process control model, an operating response of the installed product to the received estimate output; and in response to receiving the estimate output, executing a true-up model to generate a control action to reduce uncertainty of the estimate output. The inventors note that in the asset or system's current and/or future states, it may be appreciated that accurate estimates of damage and performance, as provided by one or more embodiments, are desired so that resultant control actions provide the desired physical operations.

A technical effect of some embodiments of the invention is an improved and/or computerized technique and system for managing system-level performance variation by using a system model to identify specific high-operating risk assets that may need to be "trued-up" via an intervention/inspection. Embodiments provide for the recommendation of different levels of intervention depending on the amount of uncertainty associated with a damage model output and its ultimate effect on the operational utility of the asset or system of assets. Embodiments provide for a rational, transparent, quantitative approach to quantifying acceptable uncertainty at an individual component level to achieve fleet-wide metrics. Embodiments provide for the identification of non-obvious, system-level solutions for managing maintenance or performance risk (e.g., minimizing maintenance cost, maximizing equipment usage), with no compromise on safety. For example, real world benefits include accurate current physical and operational state estimates (e.g., estimated damage and/or performance state of the asset) (such as heat rate, cycle time, tollerancing, etc.) and future state attainment by controlling the operations of individual assets and the processes which use them in the current time for the optimal benefit over one or more of future time intervals. In one or more embodiments, if the model error is not suppressed, the computing control system may not find an operating control solution or the control actions taken may not reduce operating risk with respect to the desired states in either the current or future or intervals of time. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

Figure 3A:
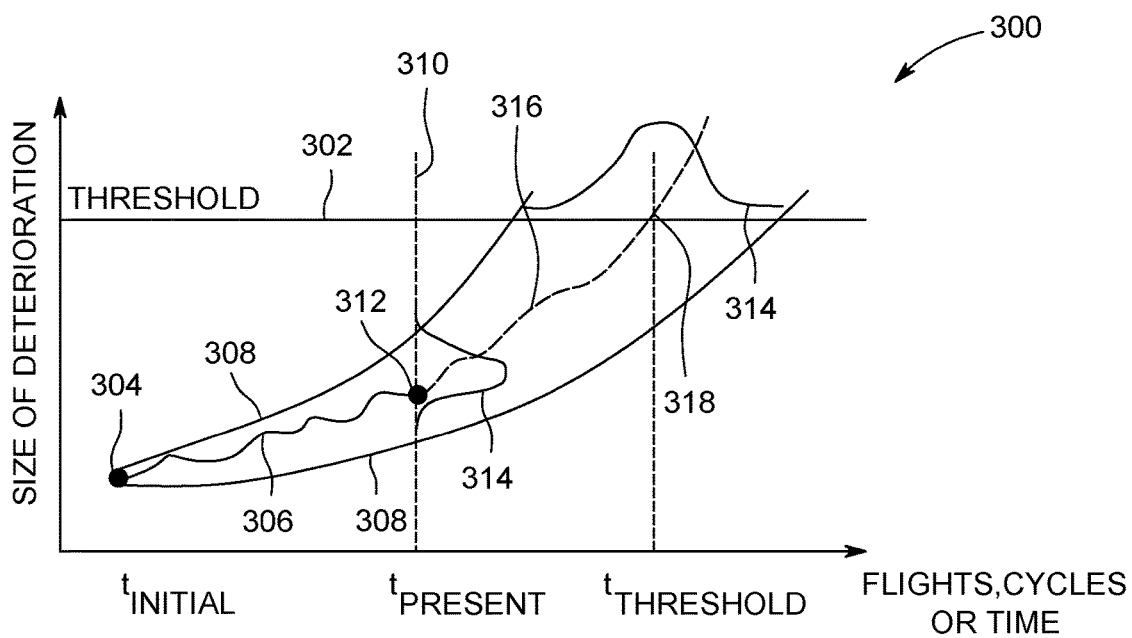
Figure 3B:
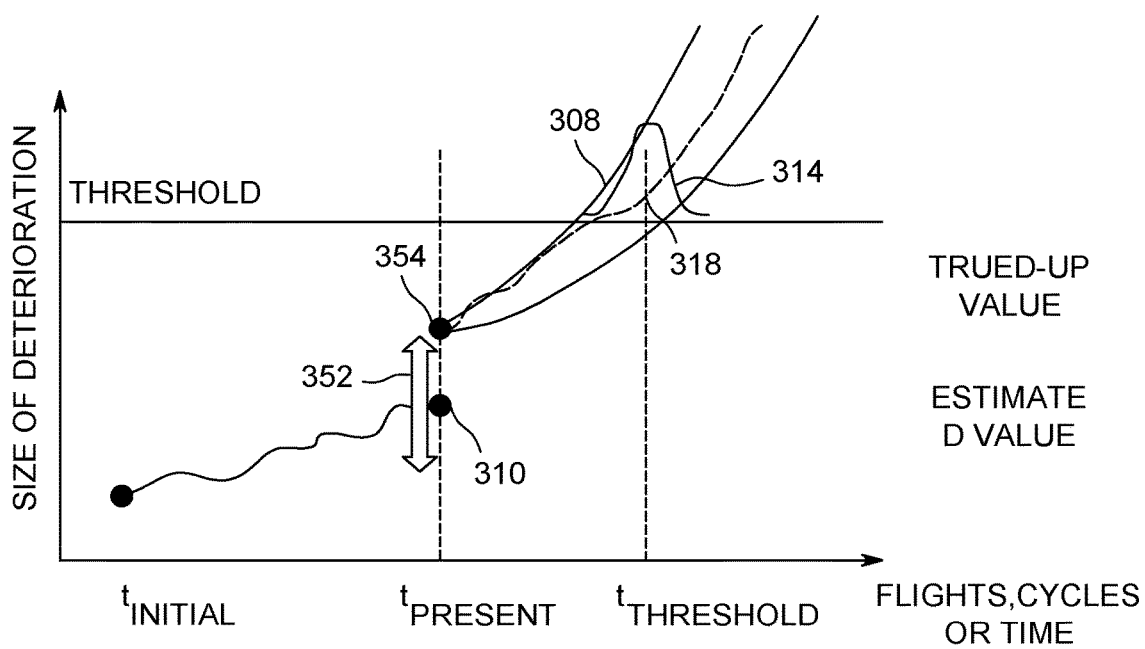

FIGS. 3A-3B each illustrates a graph according to some embodiments.

FIGS. 4A-4D each illustrates a graph according to some embodiments.

FIGS. 5A-5C each illustrates a graph according to some embodiments.

Figure 6:
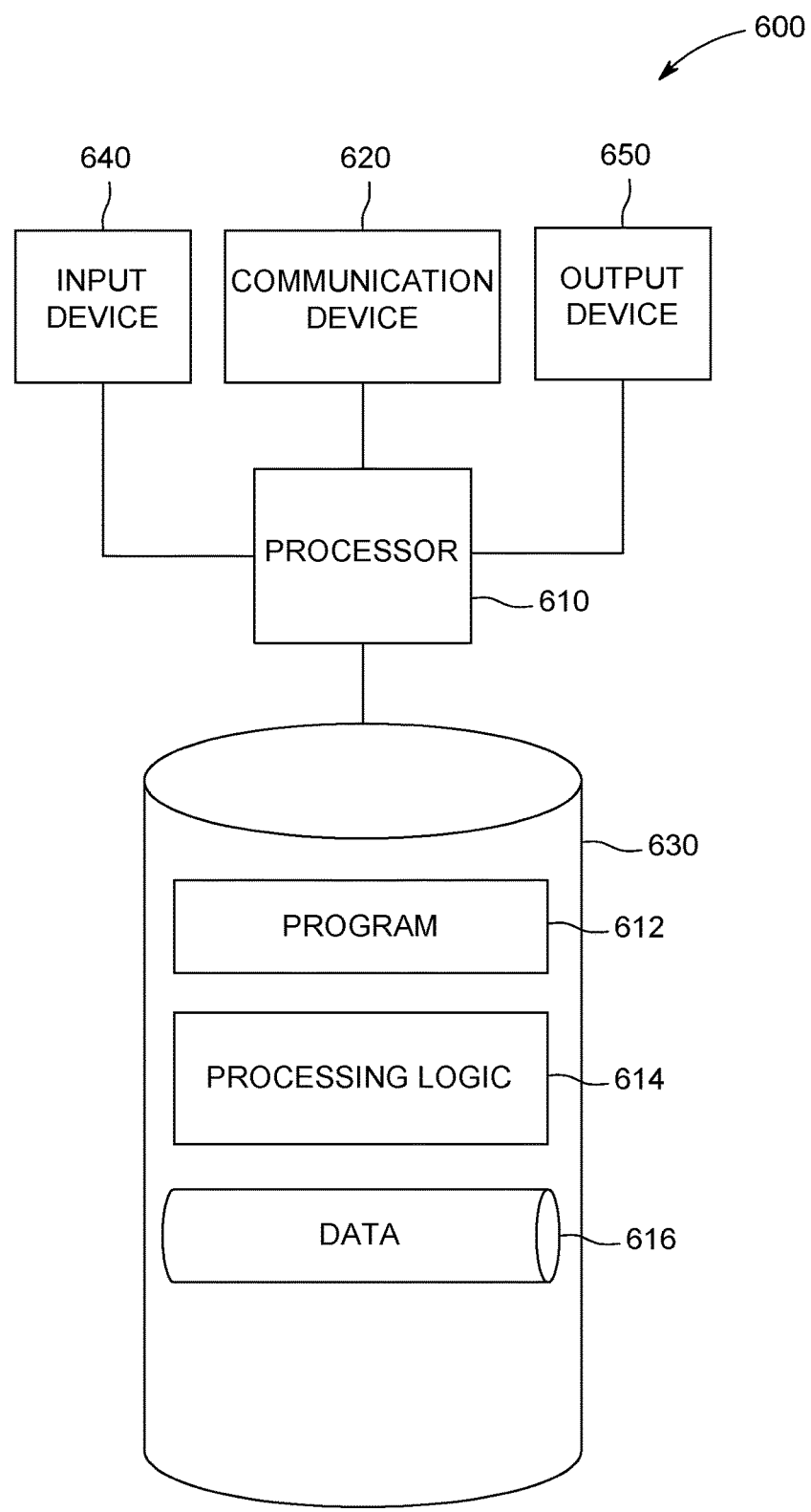

FIG. 6 illustrates a block diagram of a system according to some embodiments.

Figure 7:
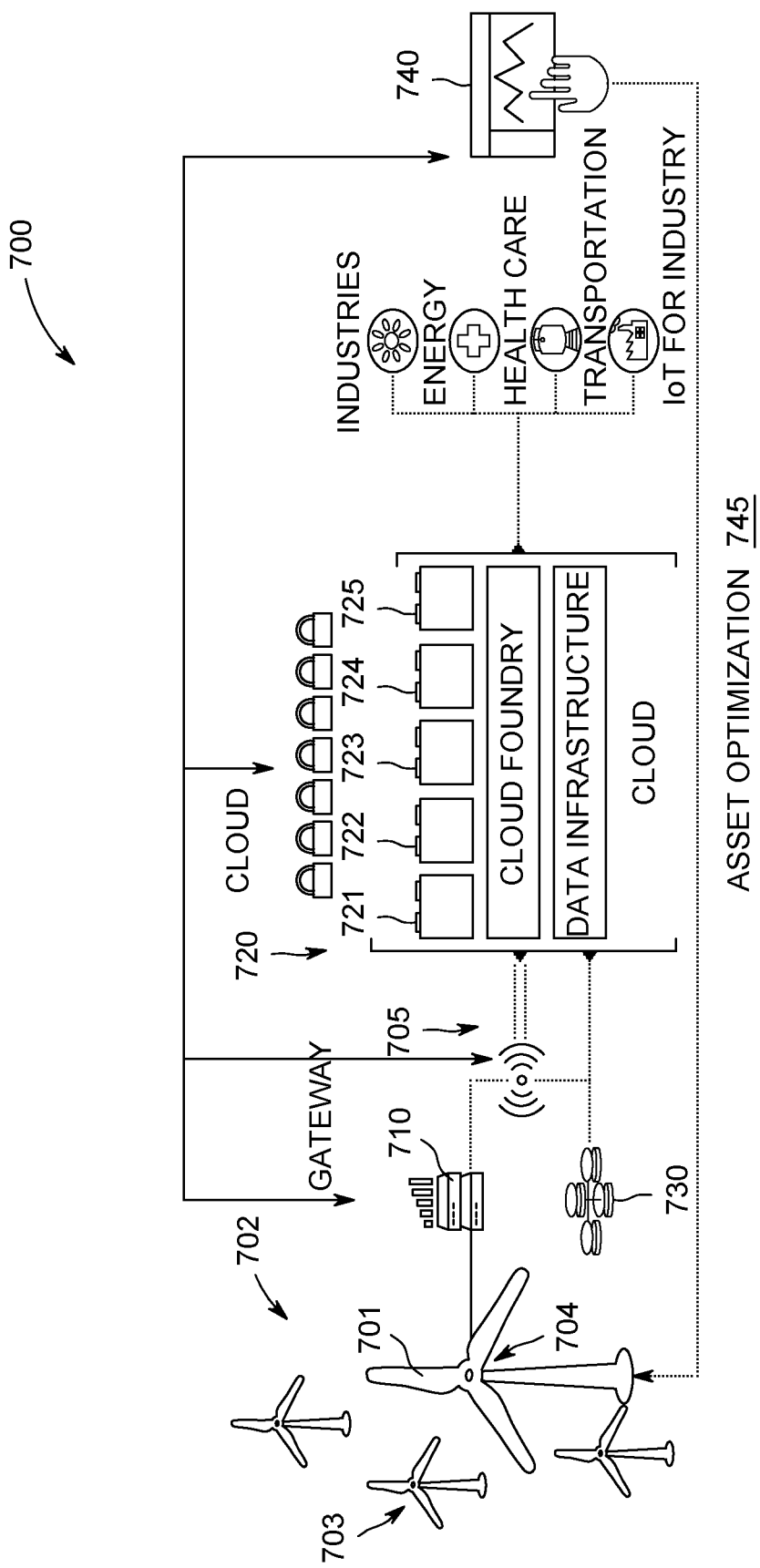

FIG. 7 illustrates a block diagram according to some embodiments.

Figure 8:
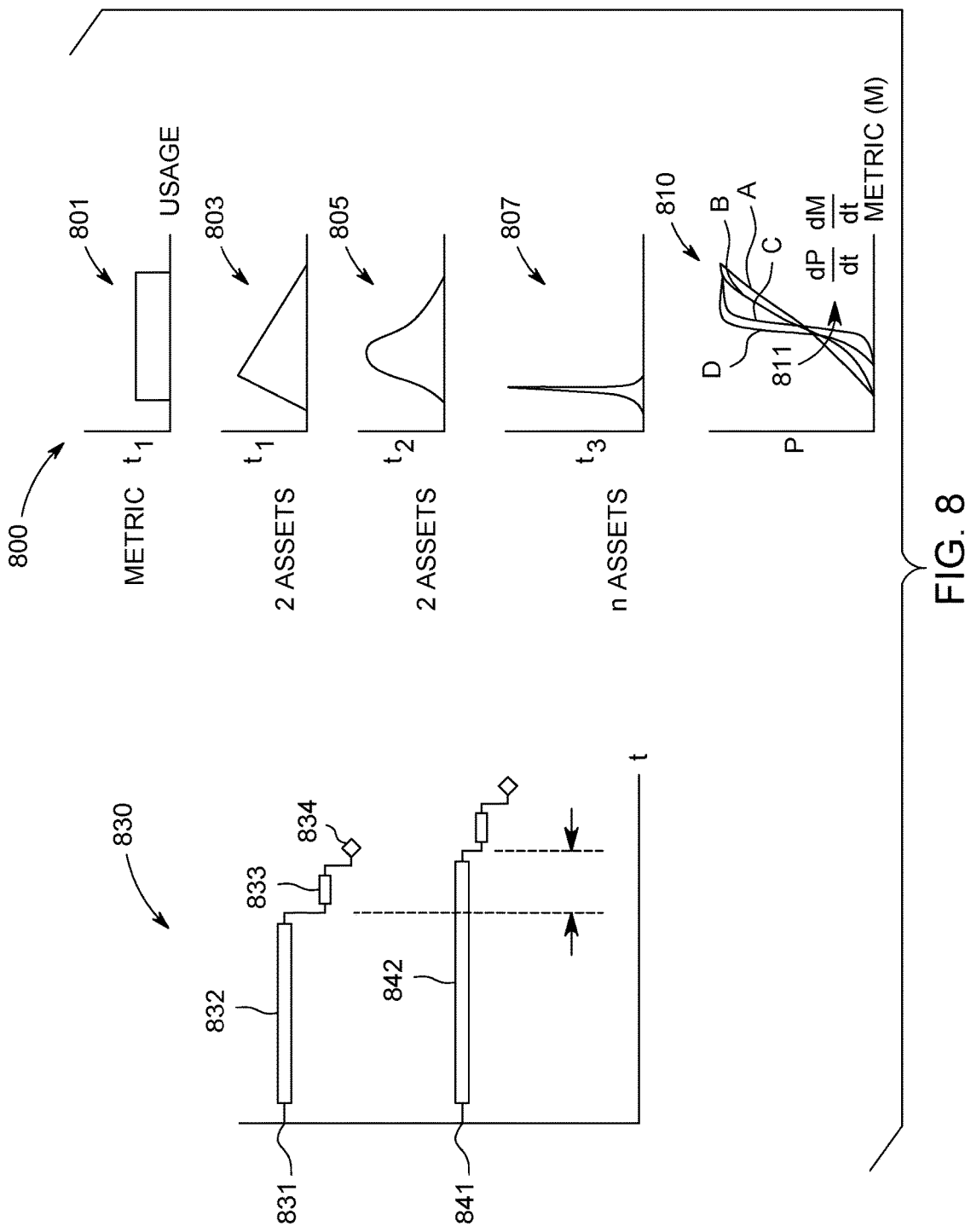

FIG. 8 illustrates several graphs according to some embodiments.

DETAILED DESCRIPTION

Assets, including the asset components, typically acquire damage during normal operation. For industries, a challenge is assessing a health status (e.g., state of damage or state of performance) of an asset, and then scheduling appropriate maintenance or operations to avoid unexpected failures or suboptimal performance. Conventionally, a mix of sensors and analytics in condition-based and prognostic maintenance programs are used to assess the health status. Cumulative damage models may be used to estimate the damage state of components which cannot be directly observed in operation. These state estimations are in the present and may be anticipatory by virtue of the system's ability to calculate state in current and future time. These models are used to recommend inspections to: (1) verify the damage and (2) perform a shop visit repair when uncertainty is detected. Typically, local optimization is performed at a component level via the condition-based and prognostic maintenance programs using coarse forecasts (e.g., simple linear extrapolation of the damage state) to determine when a damage state for a component of the asset crosses a certain threshold. This simple threshold level is typically for a specific component, without any regard to system-level impacts (e.g., shop scheduling, availability of parts, etc.) and is limited by a past operations being the same as the future paradigm (which the simulation overcomes).

In one or more embodiments, the sensing and control system of the asset is changed to be an integrated physical device with a local and remote computing control system with computational elements in one or both local and remote processors. As a consequence, there may be new opportunities to enhance the operational value of some industrial assets using novel industrial-focused hardware and software. One or more embodiments provide an integrated system that controls the physical state of the asset and the processes which use it/them through time to provide the utility for which the system may be purchased or leased.

One or more embodiments provide for the use of system-level goals in one or more time intervals along with a system model to manage system-level risk (global optimization) to identify when and what type of intervention to perform. While the models are used to predict a damage state of a component, there may be uncertainty associated with the predicted or estimated damage state. Embodiments manage system-level risk (e.g., uncertainty in one or more desired fleet-level operating goals/targets) by using a system model to identify specific high-risk components (e.g., engines with high uncertainty in the damage states), that may need to have the actual damage state "trued-up" via an intervention/inspection to reduce the global system risk to an acceptable level. The global system performance risk may be described using the current time interval, however, future damage and performance may be implemented virtually in the simulator with the current time state estimation as the (most accurate) starting point.

In one or more embodiments, the simulation subcomponent may execute logic for state estimation in future time just as it may be executed in current time, only with changing exogenous conditions and implementing operations logic. In one or more embodiments, the state estimate in current time may be a physical sensing, operational and analytical computation-control point. In one or more embodiments, the resulting states may be propagated into the future via a computational process. As used herein, a "true-up" is the process to determine the actual state or at least a better estimate of the actual state of a component in the current time where it benefits a current performance and/or where it may be used in a state control action to predict and then shape a future damage or performance state. In one or more embodiments, a true-up plan or control action may include at least one of an inspection method, an in-operation test sequence method and an in-operation data burst method.

As described above, it may be desirable to predict when maintenance for a given component should be scheduled. To make these predictions, models may be used. However, the models may not be one hundred percent accurate, and there may be uncertainty associated with the model's prediction. This uncertainty may be so large, that the prediction may not be helpful. One or more embodiments provide analytics and methods to understand when the uncertainty is so large that it may need to be "trued-up," and methods for "truing-up" the uncertainty. In one or more embodiments, a "true-up" method or control action may include a test protocol to execute during operation of the component (e.g., in-operation test sequence method or in-operation data burst method). One or more embodiments may provide a different method to reduce the uncertainty based on the amount of uncertainty that is needed to be reduced (e.g., trade-off of complex/costly intervention versus an amount of uncertainty reduced). One or more embodiments provide for narrowing the uncertainty to better predict when a given component should be brought in for maintenance. One or more embodiments may optimize a network of components based on the health status of individual components. For example, in terms of a global optimization, a decision may be made that negatively impacts one plane to benefit a fleet of planes.

Computational models are used to analyze data and generate results that may be used to make assessments and/or predictions of a physical system. An owner or operator of a system might want to monitor a condition of the system, or a portion of the system to help make maintenance decisions, budget predictions, etc.

Some embodiments relate to digital twin modeling. "Digital twin" state estimation modeling of industrial apparatus and/or other mechanically operational entities may estimate an optimal operating condition, remaining useful life, operating performance such as heat rate or other metric, of a twinned physical system using sensors, communications, modeling, history and computation. It may provide an answer in a time frame that is useful, that is, meaningfully priori to a projected occurrence of a failure event or suboptimal operation. The information may be provided by a "digital twin" of a twinned physical system. The digital twin may be a computer model that virtually represents the state of an installed product. The digital twin may include a code object with parameters and dimensions of its physical twin's parameters and dimensions that provide measured values, and keeps the values of those parameters and dimensions current by receiving and updating values via outputs from sensors embedded in the physical twin. The digital twin may have respective virtual components that correspond to essentially all physical and operational components of the installed product and combinations of products or assets that comprise an operation.

As used herein, references to a "digital twin" should be understood to represent one example of a number of different types of modeling that may be performed in accordance with teachings of this disclosure.

The term "installed product" should be understood to include any sort of mechanically operational entity, including, but not limited to, jet engines, locomotives, gas turbines, and wind farms and their auxiliary systems as incorporated. The term is most usefully applied to large complex systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain and etc.

As used herein, the term "automatically" may refer to, for example, actions that may be performed with little or no human interaction.

Figure 1:
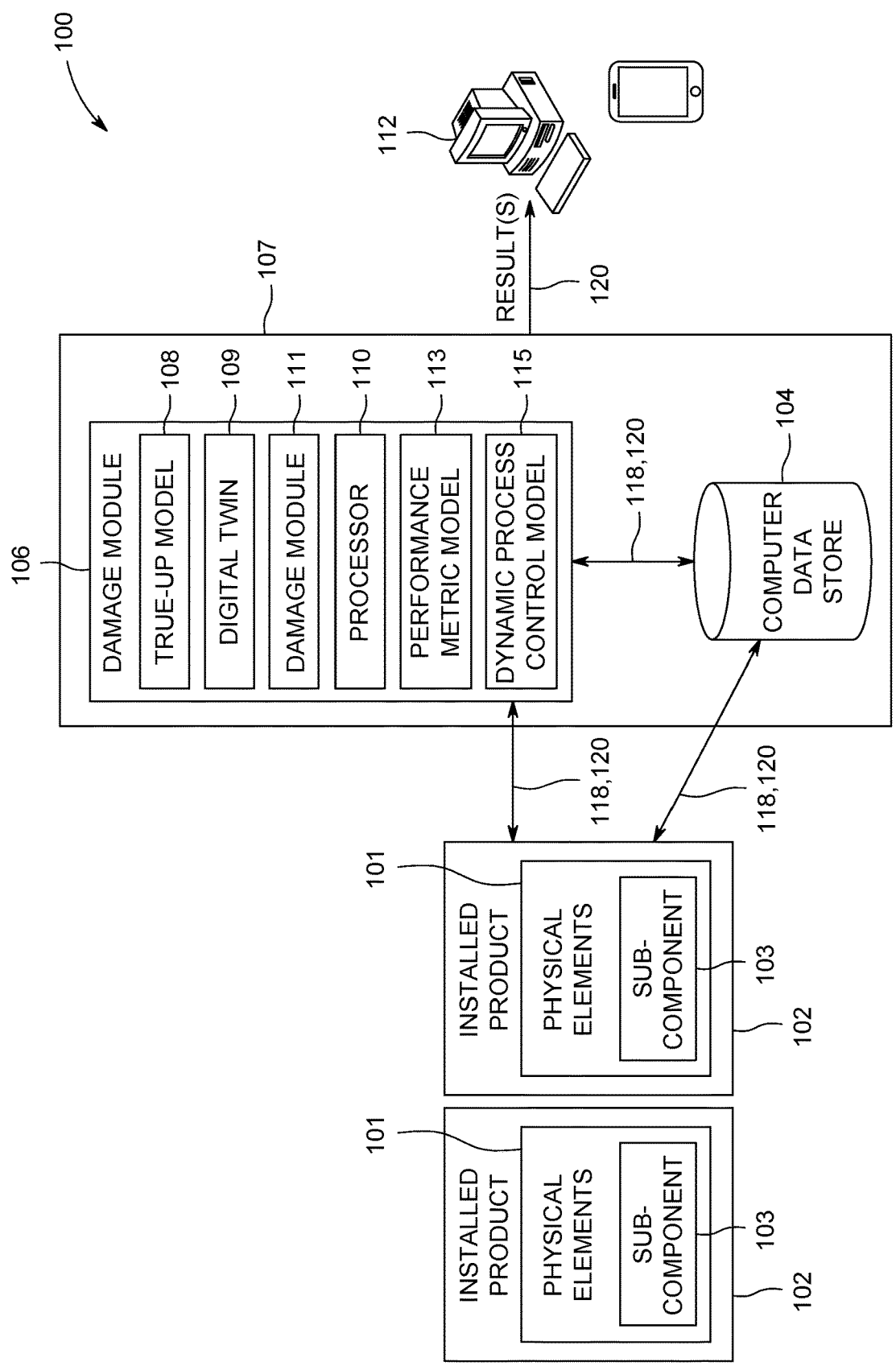
FIG. 1 illustrates a system according to some embodiments.

Turning to FIG. 1, a block diagram of a system 100 architecture is provided according to some embodiments. The system 100 may include at least one "installed product" 102. While two installed products 102 are shown herein to represent a fleet of installed products 102, any suitable number may be used. It is noted that each installed product 102 communicates with a platform 107, and elements thereof, in a same manner, as described below. As noted above, the installed product 102 may be, in various embodiments, a complex mechanical entity such as the production line of a factory, a gas-fired electrical generating plant, a jet engine on an aircraft amongst a fleet (e.g., two or more aircrafts or other assets), a wind farm, a locomotive, etc. As used herein, the terms "installed product" and "asset" may be used interchangeably. The installed product 102 may include a considerable (or even very large) number of physical elements or components 104, which for example may include turbine blades, fasteners, rotors, bearings, support members, housings, etc. As used herein, the terms "physical element" and "component" may be used interchangeably. The installed product 102 may also include subsystems, such as sensing and localized control, in one or more embodiments.

The system 100 may include a platform 107. In some embodiments, the platform 107 may include a computer data store 104 that may provide information to a damage module 106 and may store results from the damage module 106. The damage module 106 may include a true-up model 108, a digital twin 109, a damage metric model 111, and one or more processing elements 110. In one or more embodiments, the damage module 106 may include a performance metric model 113 instead of, or in addition to, the damage metric model 111. In one or more embodiments, the performance metric model 113 may provide an estimate of system-level operating performance on at least one of one or more asset and one or more coupled systems, in a similar manner to that described below for the damage metric model 111. In one or more embodiments, the damage module 106 may include a dynamic process control model 115. In one or more embodiments, in response to a received damage estimate, the dynamic process control model 115 may generate a dynamic operating response of the installed product 102 (including any appropriate sub-component 103) with respect to its one or more operating parameters. In one or more embodiments, if the damage estimate does not result in an operating ramification for the installed product, no action may be taken. In one or more embodiments, if the damage estimate does result in an operating ramification for the installed product, the system may be perturbed to secure a measurement and/or call for a physical measure, such as an inspection. The processor 110 may, for example, be a conventional microprocessor, and may operate to control the overall functioning of the damage module 106. In one or more embodiments, the processor 110 may be programmed with a continuous or logistical model of industrial processes that use the one or more installed products 102. In one or more embodiments, the processor 110 may receive engineered sensing and control data for dynamically updating a forecasted physical and operational state information from individual assets and the processes which use them with actual system states with respect to efficiency, life and the process system performance.

In one or more embodiments, the damage module 106 may calculate the current condition of an asset with integrated current time sensor and control inputs, for example, while also simulating the asset and the systems which use them ahead of real time in order to beneficially change the operation of the assets in one time interval to achieve a preferred future performance in another time interval. Reducing the uncertainty of the state estimates provided by the models 108, 109, 111, 113, 115 within the system 100 may provide a constantly refreshed state calculation with the most current asset data, in effect "trueing up" the models with actual physical and operational states, in one or more embodiments. In one or more embodiments, the true-up model 108 may be dynamically refreshed.

In one or more embodiments, the damage metric model 111 may estimate an extent of damage on one or more components. In one or more embodiments, the damage metric model 111 may estimate a performance indicator as well.

In one or more embodiments, the true-up model 108 may allow operators of the installed product 102 to generate a plan or recommendation to reduce uncertainty of the damage estimate. In one or more embodiments, the reduced uncertainty state may be used to simulate future operations forward and dynamically optimize operational set-points and assignments between current and future time intervals.

In one or more embodiments, the data store 104 may comprise any combination of one or more of a hard disk drive, RAM (random access memory), ROM (read only memory), flash memory, etc. The data store 104 may store software that programs the processor 110 and the damage module 106 to perform functionality as described herein.

The damage module 106, according to some embodiments, may access the data store 104 and utilize the true up model 108, the digital twin 109 and the damage metric model 111 to create a prediction and/or result that may be transmitted to at least one of various user platforms 212, back to the installed product 102 or to other systems (not shown), as appropriate (e.g., for display to a user, operation of the installed product, operation of another system, or input to another system).

The damage module 106 may be programmed with one or more software components that may model individual physical elements 101 that make up the installed product 102.

A communication channel 118 may be included in the system 100 to supply data from at least one of the installed product 102 and the data store 104 to the damage module 106.

In some embodiments, the system 100 may also include a communication channel 120 to supply output from the true-up model 108, digital twin 109 and damage metric model 111 in the damage module 106 to at least one of user platforms 112, back to the installed product 102, or to other systems. In some embodiments, signals received by the user platform 112, installed product 102 and other systems may cause modification in the state or condition or another attribute of one or more physical elements 101 of the installed product 102.

Although not separately shown in the drawing, one or more control units, processors, computers or the like may be included in the installed product 102 to control operation of the installed product 102, with or without input to the control units, etc., from the damage module 106.

As used herein, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

A user may access the system 100 via one of the user platforms 112 (e.g., a control system, personal computer, tablet, or smartphone) to view information about and/or manage the installed product 102 in accordance with any of the embodiments described herein. According to some embodiments, an interactive graphical display interface may let an operator define and/or adjust certain parameters and/or provide or receive automatically generated recommendations or results.

Figure 2:
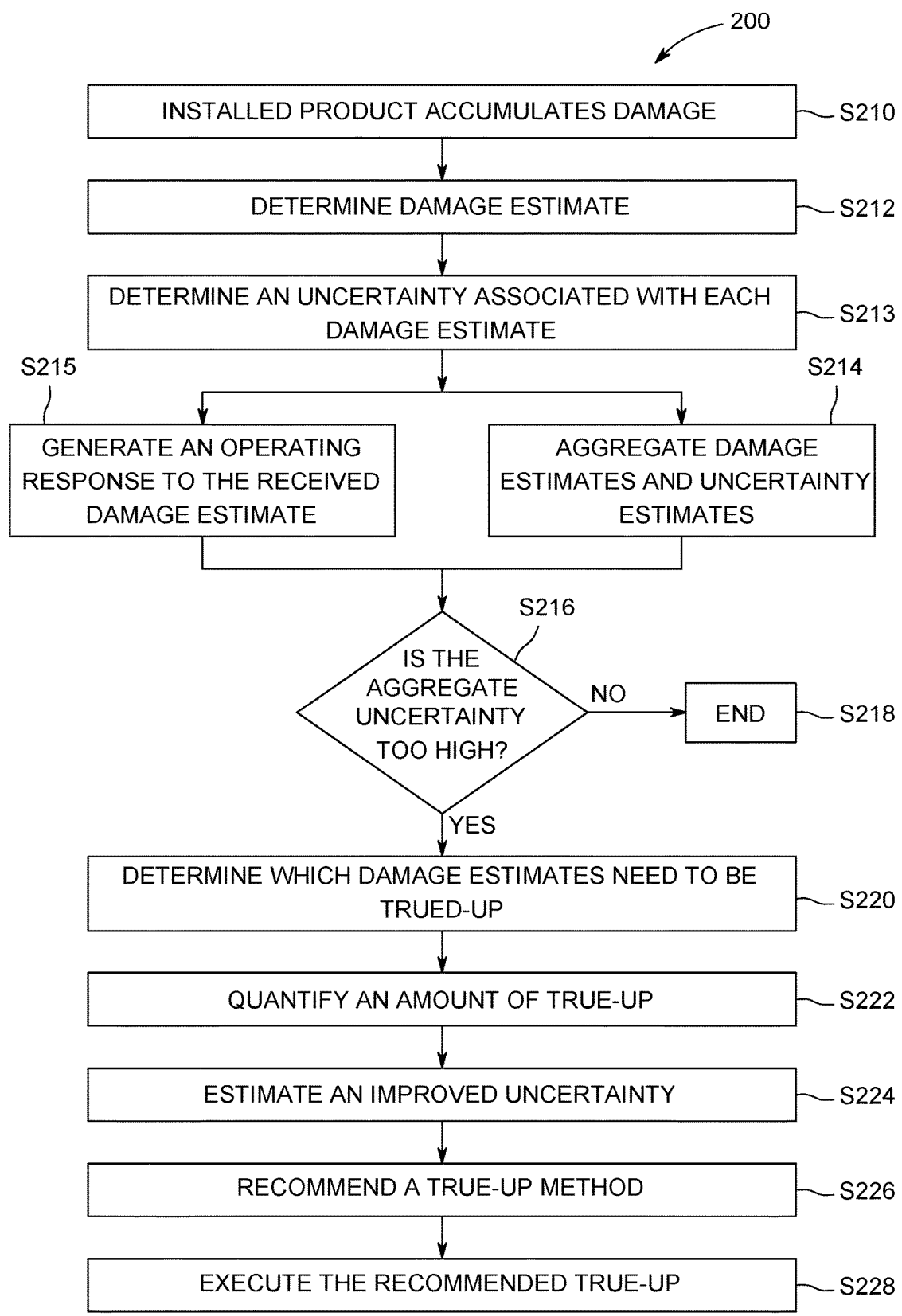
FIG. 2 illustrates a flow diagram according to some embodiments.

Turning to FIGS. 2-5, a flow diagram and associated graphs, of an example of operation according to some embodiments is provided. In particular, FIG. 2 provides a flow diagram of a process 200, according to some embodiments. Process 200, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Initially at S210, an installed product 102 accumulates damage during operation thereof. In a non-exhaustive example used herein, the installed product 102 may be an aircraft, and the component 101 may be the engine. In one or more embodiments, the component 101 may include one or more sub-components 103. In the non-exhaustive example, a sub-component may be a blade in the engine. As described above, embodiments may include other suitable installed products 102, components 101 and sub-components 103.

Then at S212, the damage module 106 may determine via execution of the damage metric model 111 a damage estimate for at least one of: one or more components 101 and one or more sub-components 103.

In one or more embodiments, the damage metric model 111 may be used to estimate/calculate an extent of damage on a component. The damage metric model 111 may receive as input one or more measured sensor values from the installed product 102 or computer data store 104, and in some instances operating conditions, to output an estimated damage for a given component. As described above, a single component 101 may include multiple sub-components 103, and therefore the damage metric model 111 may be executed at least once for each sub-component 103. The inventors note that even at the sub-component level, there may be multiple damage modes (e.g., a blade may have damage at a root thereof, or a tip thereof, etc.) Then, the determined damage estimate for each sub-component 103 may be aggregated to provide a damage estimate for the component 101.

Turning to FIG. 3A, a graph 300 is provided, showing a progression of a single damage or deterioration mode for a sub-component (e.g., spallation growth on a blade over time). The graph 300 may show the probability distribution of a physical parameter (e.g., spallation growth) as a damage mechanism over time, which may have an associated uncertainty in an operational decision (e.g., when to take the engine in for maintenance). Inputs to the damage metric model 111 may include, for example, a particular speed, temperature, and pressure at which the blade is being flown to see how the crack may grow. Since it's a model, there may be uncertainty around the model. As such, when forecasts are made, there may be uncertainty with the model and uncertainty about what will happen in the future and how the blade will fly. The inventors note that the simulation component of the system may present hypothetical operations to the state estimation and compute current and future time intervals under various operating and maintenance assumptions.

In one or more embodiments, a failure may occur when the damage crosses a threshold 302. In one or more embodiments, the concept of threshold may be generalizable to any conditional logic (e.g., not just a simple threshold). At $t_{initial}$ 304, the damage may have a certain value that increases in time as flights get flown, as indicated by the solid thick line 306. In one or more embodiments, the damage 306 indicated by the solid thick line may be based on measured input of known parameters. The uncertainty in the model's prediction of the extent of damage 308, may grow in time due to uncertainty one or more factors, including but not limited to measurements and sensor readings.

At $t_{present}$ 310, the estimated damage may have a mean value 312 and a distribution of uncertainty 314 around the mean.

In one or more embodiments, the damage module 106 may make a forecast of the future damage growth 316 (dotted line), which may result in an estimate of the time at which the threshold 302 will be crossed ($t_{threshold}$ 318). The inventors note that this estimate may be based on assumptions about how the plane/engine/blade will fly and may be probabilistic with a distribution and/or provided by the simulator. For example, the future flights may be the same as the past flights, and/or there may be a schedule of flights to determine how the plane/engine/blade will fly. The estimate for $t_{threshold}$ 318 may also have a distribution of uncertainty 314, as there may be a distribution of uncertainty of the time when the damage will cross the threshold 302.

At time $t_{present}$ 310, the uncertainty in the value of the damage estimate may have a distribution 308, which may result in a corresponding uncertainty in $t_{threshold}$ 318. This uncertainty may be undesirable, and instead of relying on the damage estimate at $t_{present}$, a true-up of the damage state of the component/subcomponent may be performed. As used herein, the term "true-up" means to determine a better estimate (with lower uncertainty) of the actual damage state (e.g., via an inspection, in-operation test sequence, data-burst or other method).

FIG. 3B, provides a graph 350 of the damage state progression, which is similar to the graph 300 shown in FIG. 3A. The difference is, in FIG. 3B, the damage module 106 has "trued-up" at $t_{present}$ via execution of the true-up model 108 resulting in a narrower uncertainty in the $t_{threshold}$ 318. In one or more embodiments, the "true-up" may reset the output of the damage metric model 111 to the actual value at $t_{present}$, as shown in FIG. 3B. The actual value of the damage state may go up or down from the estimate in FIG. 3A, as indicated by the arrow 352. In the graph 350 provided herein, the crack is bigger than what the model predicted, as indicated by the true state 354. After trueing-up the output of the damage metric model 111, the uncertainty is reduced at $t_{present}$, as there may still be some uncertainty remaining. As shown in the graph 350, the uncertainty distribution 308 may now grow from $t_{present}$ (rather than $t_{initial}$), resulting in a smaller uncertainty at $t_{threshold}$ 318 because of the trued-up output.

Turning back to the process 200, in S213, an uncertainty associated with each of the damage estimates is determined.

Then in S214, the damage module 106 may aggregate the determined damage estimates for the component(s) 101 and/or sub-component(s) 103 to generate an overall health state of the installed product 102 and/or component 101, respectively, and an aggregate uncertainty associated with the aggregate damage estimate. In one or more embodiments, the features of S214 may be active for any time period—past, current or future, as the uncertainty it is controlling is damage state estimation. As described above, there may be more than one damage mode for a component 101 (e.g., one damage mode associated with an estimate describing crack growth on a blade, another damage mode associated with an estimate describing pitting of the blade). The damage estimate may be calculated for each damage mode, as described above, and any one of the damage estimates crossing the threshold may result in an engine failure, for example.

One or more embodiments provide for processing control, which may enable the optimal selection and weighting of sundry damage analytics through one or more time periods (e.g., a current time and a simulated future time interval). For example, FIG. 4A, 4B and 4C each show a graph 430, 425 and 420, respectively, of a damage estimate for a particular damage mode (e.g., excessive clearances between rotating and fixed components, wear in coating/erosion on the blade, a crack on a blade tip or other component in the system) at a point or interval of time. Each of these damage estimates (and their associated uncertainty probabilities) may be aggregated to give an overall view of the probability of failure for the entire engine, as shown in FIG. 4D. The graph 400 in FIG. 4D may provide an aggregated view of estimated damage (mean and distribution) of $t_{threshold}$ 418 for the entire engine. For reasons such as analytical precision due to certain methods for estimation in a given failure or performance process, a given model 420, 425, 430 may have comparative strength singularly, or in combination with certain other estimator analytics, as described further below. One or more embodiments provide a computing control mechanism which may optimally select the one or more analytical estimators.

In one or more embodiments, at present time 435, a desired specificity 445 may be needed such as to differentiate between two repair or operating modes for a certain control action in the physical world, such as the acquisition of state measurement information. The estimated specificity may not differentiate a control action 450 and the system 100 may seek to boost the precision for such differentiation via two steps 455. A first step may be the selection of a candidate damage analytic (e.g., digital twin) 460 as a binary decision where one or more candidate analytics may be selected. A second step may weight the contribution of the selected analytic 465. In a similar way, at an estimated threshold value 418, an actual or forecast value 440 may fall outside of the differentiation of one physical system control action versus another 445, and the error may be iterated down 450 until combinations of damage analytics may be explored 460, 465 in either a parametric search space or a goal seeking optimization method, for example. Other suitable exploration methods may be used. In either analytical selection or weighting, embodiments may minimize the variation of damage estimate sufficient to differentiate the control action in the physical world which selects the true-up method and timing 470. An example true-up action may be the use of one or more other asset state estimates in a portfolio of assets or the assignment of a physical state estimation data acquisition on one or more assets at one or more times, for example. Other suitable true-up actions may be used.

For one or more periods of time ($t_1 \rightarrow t_n$) 470, the estimated damage may be compared to a desired specificity 445 sufficient to differentiate control actions, in one or more embodiments. The as-is or simulated future damage or performance estimated may be compared to the required or desired specificity and the error may be calculated, in one or more embodiments. Then the one or more candidate(s) damage analytic or performance analytic may be selected 460 for inclusion into the consensus estimate 400 until the variation is minimized 435, 440 by inclusion alone. For the included analytics, their contributing weights 465 may then be iterated upon until the desired specificity 445 is met. In one or more embodiments, the search for inclusion and weighting of the damage analytic(s) may be a full enumeration method, which may be computed one or more computing nodes, an evolutionary method (e.g., Heuristic or Gradient Search), or any other suitable method. For selected analytics, their contributing weights may be selected by optimization methods (e.g., full enumeration, search based, or any other suitable optimization method). The desired specificity 445 may differentiate between maintenance and/ or control actions and does not violate engineering or operating limits over one or multiple intervals of time.

In one or more embodiments, in the selection for inclusion 460 or weighting 465, features related to asset-use may be used to differentially use or weight the damage or performance analytic. Some examples of these features may include cycles, time, rate of damage estimation change as a function of operations or time or triggering state changes from other assets under management that act as leading indicators or proxies for a given set of assets or systems whose damage or performance is being computed for with the system 100. Other suitable examples of features may be used.

Turning back to process 200, in parallel to S214, an operating response to the received damage estimate in S213 is generated in S215. In one or more embodiments, there may be uncertainty related to simulated forward system response dynamics. In one or more embodiments, the features of S215 are directed to system performance that may be calculated with a dynamical system transfer function (e.g., a discrete event simulation). The system performance may be a consequence of damage.

Then in S216, it is determined if the uncertainty associated with the aggregate damage estimate at $t_{threshold}$ 418 is too high. In one or more embodiments, there are at least two means, that are not mutually exclusive, that may make the uncertainty too high: the features described in S214 and the features described in S215. In one or more embodiments, the determination that the aggregate damage estimate at $t_{threshold}$ 418 is too high may be highly dependent on operations. In one or more embodiments, the damage module 106 and true-up model 108 may receive as an input one or more system-level metrics, which may be used to determine if the uncertainty associated with the aggregate estimate at $t_{threshold}$ 418 is too high. In one or more embodiments, the system-level metrics may provide an understanding of broader system operations (e.g., for the entire fleet of planes) to determine which plane(s) needs to have damage estimates trued-up to achieve the broader fleet-level metric (e.g., percentage of flights flown, yield percentage, a financial metric, on-time departures).

In one or more embodiments, the broader fleet-level metric may be a measure of something that may not be a direct engineering damage quantification. In one or more embodiments, the fleet-level metric may be a financial goal, on-time departure goal, or other operational metric, that does not compromise safety. For example, an airline may really care about flying passengers, and may place a greater emphasis on delivering ninety percent of their passengers on time (fleet level metric) than on a deterioration in a blade (e.g., spalling, excessive clearances, cracking, fatiguing and etc.) that lowers its efficiency (engineering damage quantification) and does not compromise safety.

In one or more embodiments, the damage module 106 may use a "system of system" simulation (e.g., a digital twin operations optimization (DTOO) simulation) 109 to understand (e.g., quantify) a mean and distribution of the fleet-level metric if no operational changes are made to the existing component, and to compare this fleet-level metric against a target in and through time. For example, FIG. 5A shows a mean and distribution for a fleet-level metric "as-is," with no change 502, 504, respectively, and for a desired target 506, 508, respectively. In one or more embodiments, the DTOO simulation 109 may be used with the true-up model 108 to aggregate the damage estimates for the sub-components, to the components, to the engines, to the planes to the fleet of planes, to determine if the fleet-level metric is met. In one or more embodiments, if the target is not met, the DTOO simulation 109 may be used to determine which component(s) need to be trued-up in order to meet the overall fleet target through time. For example, the DTOO simulation 109 may indicate which components need to be trued-up. The inventors note that determining which component needs to be trued-up to meet the overall fleet target may not be obvious, as some components (e.g., engines) may be allowed to have larger uncertainties (e.g., depending on the routes they will fly) and other components may be required to have lower uncertainties (if, for example, flying a more severe route). In one or more embodiments, there may and may not be a same acceptable uncertainty for all of the components in the fleet, and the uncertainty may be highly dependent on expected operations for the component.

It may be desirable to reduce the overall $t_{threshold}$ 418 uncertainty to improve scheduling of preventative maintenance and avoid component failure, (e.g., to maximize engine use, while not compromising safety. It may be desirable to accurately schedule maintenance because if acting conservatively, a part may be removed from action early, losing life on the part, and if the part is removed from action too late, there may be part degradation that impacts performance or failure. The inventors note that improving scheduling of preventative maintenance may have ripple effects on, for example, shop loading (e.g., there are only a finite number of shops that can perform the maintenance, and there is a need to make sure there are time slots available to perform the maintenance), and parts and inventory management (e.g., parts may be expensive and a shop may not want to carry them if they do not need them). The inventors further note, for example, that FIG. 4D is for a single engine, but each plane has at least two engines, and a fleet of two or more planes may have hundreds of engines, so the scheduling/preventative maintenance goals may increase exponentially.

Turning back to process 200, in S216 it is determined that the uncertainty is not too high, the process 200 ends at S218.

If in S216, it is determined that the $t_{threshold}$ 418 uncertainty is too high (e.g., the uncertainty is so large, $t_{threshold}$ 418 may not provide meaningful information for scheduling maintenance), the process 200 proceeds to S220, and it is determined which damage estimates that form the aggregate need to be trued-up (e.g., back up from the component level). One or more embodiments, may determine which damage estimate is causing the largest amount of uncertainty in the aggregate. For example, most of the uncertainty associated with the component in FIG. 4D is from the damage mode associated with FIG. 4A, while the damage modes associated with FIGS. 4B and 4C provide little uncertainty.

After it is determined which damage estimate is causing the largest amount of uncertainty in the aggregate, the amount of true-up needed to reduce the uncertainty for the damage estimate to an acceptable level may be quantified in S222. In one embodiment, the system simulator may be used to calculate the contribution to variance of the damage or performance at one or more intervals of time by calculating replications and the partial derivatives of state estimation on the overall system performance or damage metrics.

While a true-up by inspection may result in very little to no uncertainty regarding the damage estimate of the component, the inventors note that inspections may be costly and that from a global optimization perspective, it may be desirable to perform another form of true-up that decreases the uncertainty by some amount less than almost 100% (e.g., perform a true-up that makes the uncertainty 20% better). For example, a fleet includes five planes, one of which has about a 6 month window in which it will need maintenance. The 6 month window may be too great, and a DTOO simulation model may be run to get the window down to 2 months, which is an acceptable metric, or maybe down to a specific day because the shops are very constrained. In one or more embodiments, one or more constraints may affect an acceptable level of uncertainty. In one or more embodiments, some constraints may be imposed by the model itself (e.g., indeterminate repair work-scope or assignment of damage or performance at the system level with enough specificity to a sub component), while other constraints may come from operational situations (e.g., limiting the maximum thrust or rate of work output or patterns of usage of the asset or an on-wing maintenance event such as a certain modality of washing or location of washing).

Then in S224 one or more improved uncertainties is estimated. In one or more embodiments, the damage module 106 may, via the true-up model 108, apply one or more true-up methods to the DTOO simulation 109 to acquire more information to provide an estimate of improved uncertainty associated with application of each of the true-up methods.

A first true-up method may be an inspection. While an inspection may provide the best uncertainty reduction, it may involve taking the component out of service, and therefore may be the most intrusive and expensive.

A second true-up method may be an "in-operation test sequence." In one or more embodiments, the "in-operation test sequence," may include a specified sequence of operational control inputs designed specifically to infer a measure of damage (e.g., controlling the operation of the component differently from usual operations, but within operating parameters, to obtain more data). The inference maybe direct (e.g., directly provides the data) or may be data that is fed to another DTOO 109 to provide a better idea of the damage or health of the system. For example, the "in-operation test sequence," may include a pre-defined engine operating test sequence of a particular run-up just prior to take-off, or a particular engine cycling at cruise level. The inventors note that the "in-operation test sequence" may improve the uncertainty less than the inspection plan. The "in-operation test sequence" may be executed while the component is in-operation by line personnel (e.g., pilot or maintenance staff), so there may be no need to remove the component out of service, which may make the "in-operation test sequence" plan less expensive and less obtrusive than the inspection plan. In one or more embodiments, the "in-operation test sequence" may be a manual test protocol (e.g., a pilot follows a checklist) or may be a fully automated "press a button" (e.g., a signal is sent to a plane and the plane runs the sequence without pilot involvement). The cost and disruption to perform an in operations test sequence being minor, it may be beneficially implemented before a more invasive true-up method is called. The optimal selection of sequencing may be calculated by the computing system.

A third true-up method may be an "in-operation data burst" enabled with the integrated sensing, control, data and computing system. In one or more embodiments, the "in-operation data burst" may be a pre-defined "data-burst" sensor and control recording plus associated analytical processing that may provide a better estimate of the damage. In one or more embodiments, the "in-operation data burst," may be a more focused data collection (e.g., recording data at a higher-frequency, recording additional parameters not usually saved or edge processing). In one or more embodiments, the "in-operation data burst" may be passive, and may not affect the component at all, as this plan focuses on data gathering. A benefit of one or more embodiments, is that the "in-operation data burst" may have zero operational impact, and may be a purely data gathering and analysis exercise, which may make it less expensive than both the inspection plan and the "in-operation test sequence" plan. In one or more embodiments, the "in-operation data burst" may be fully automated, and the data may be transmitted via wireless/satellite/or manually extracted at an appropriate time. The "in-operation data burst" plan may improve the uncertainty less than the inspection plan.

Then in S226, the damage module 106 may generate a recommendation of a control action (i.e., inspection, in-operation test sequence, or in-operation data-burst) to true-up the uncertainty of the damage estimate for the component based on the method that improves the estimated in the most desirable manner given a set of parameters. In one or more embodiments, the control action may be an automated perturbation of the installed product or a specified physical measurement. FIG. 5B shows a mean and distribution of a fleet-wide metric for a forecast that takes the recommended true-ups into account 510, 512, respectively, as compared to the mean and distribution of the fleet-wide metric target 506, 508, respectively. In one or more embodiments, the recommendation of a particular method or plan may impact the mean, the variance or both. For example, in a non-exhaustive scenario, the estimate for a deterioration of a certain physical clearance might be extremely large, but also with very large uncertainty, essentially recommending that an engine be immediately removed for inspection. An example of physical clearance deterioration is between compression or expansion stages of a turbine, where pressure drop loss occurs between rotating and fixed components of the apparatus and as a consequence, energy that could have been transmitted to the rotating shaft of the turbine is lost through bypassed routes enabled by the clearances, thus lowering the thermodynamic performance of the system. Because of the large uncertainty, it may be desirable to perform some form of true-up. If there are no other components requiring maintenance in the near future, it may be desirable to perform an inspection to get the best possible (lowest) uncertainty at this time in order to maximize the on-wing engine time. If, however, the engine is likely going to require a shop visit in the near future due to other components, than perhaps a lower uncertainty (and less burdensome) true-up method (such as the data-burst) may be sufficient to provide confidence the component will survive until the next maintenance action.

In S228, the recommended control action is executed. As used herein, the terms "true-up plan" and "control action" may be used interchangeably. In one or more embodiments, after the recommended true-up(s) are executed, a post-assessment may be performed to determine how effective the true-up method was at decreasing the uncertainty. For example, FIG. 5C shows the distribution of the fleet-wide metric after execution of the true-up 514. In this example, the post-true-up distribution 514 did not meet the target distribution 512, but is better than the as-is distribution 504. If the post-true-up distribution 514 does not meet the target distribution 512, an in-situ inspection of the component may be scheduled, in one or more embodiments. It may be determined in one or more embodiments, that an in-situ inspection may not need to be scheduled even if the post-true-up distribution 514 does not meet the target distribution 512, as the post-true-up distribution 514 may be close enough to the target distribution 512 for a given metric.

Note the embodiments described herein may be implemented using any number of different hardware configurations. For example, FIG. 6 illustrates a health assessment platform 600 that may be, for example, associated with the system 100 of FIG. 1. The health assessment platform 600 comprises a health assessment processor 610 ("processor"), such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users. The health assessment platform 600 further includes an input device 640 (e.g., a mouse and/or keyboard to enter information) and an output device 650 (e.g., to output and display the assessment and recommendation).

The processor 610 also communicates with a memory/storage device 630. The storage device 630 may comprise any appropriate information storage device, including combinations of magnetic storage devices (e.g., a hard disk drive), optical storage devices, mobile telephones, and/or semiconductor memory devices. The storage device 630 may store a program 612 and/or health assessment processing logic 614 for controlling the processor 610. The processor 610 performs instructions of the programs 612, 614, and thereby operates in accordance with any of the embodiments described herein. For example, the processor 610 may receive data and then may apply the instructions of the programs 612, 614 to determine a method for improving an uncertainty estimation.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

It is noted that while progress with industrial equipment automation has been made over the last several decades, and assets have become 'smarter,' the intelligence of any individual asset pales in comparison to intelligence that can be gained when multiple smart devices are connected together. Aggregating data collected from or about multiple assets may enable users to improve business processes, for example by improving effectiveness of asset maintenance or improving operational performance, if appropriate. Industrial-specific data collection and modeling technology may be developed and applied.

In an example, an industrial asset may be outfitted with one or more sensors configured to monitor respective ones of an asset's operations or conditions. Data from the one or more sensors may be recorded or transmitted to a cloud-based or other remote computing environment. By bringing such data into a cloud-based computing environment, new software applications informed by industrial process, tools and know-how may be constructed, and new physics-based analytics specific to an industrial environment may be created. Insights gained through analysis of such data may lead to enhanced asset designs, or to enhanced software algorithms for operating the same or similar asset at its edge, that is, at the extremes of its expected or available operating conditions.

The systems and methods for managing industrial assets may include or may be a portion of an Industrial Internet of Things (IIoT). In an example, an IIoT connects industrial assets, such as turbines, jet engines, and locomotives, to the Internet or cloud, or to each other in some meaningful way. The systems and methods described herein may include using a "cloud" or remote or distributed computing resource or service. The cloud may be used to receive, relay, transmit, store, analyze, or otherwise process information for or about one or more industrial assets. In an example, a cloud computing system may include at least one processor circuit, at least one database, and a plurality of users or assets that may be in data communication with the cloud computing system. The cloud computing system may further include, or may be coupled with, one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like, such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with, and configuration of, industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Performance Management Platform (APM) technology enabled by state of the art cutting edge tools and cloud computing techniques that may enable incorporation of a manufacturer's asset knowledge with a set of development tools and best practices that may enable asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

The further advancement in sensing, control, simulation and optimization in systems such as the disclosed extends past the current art APM limitations of past operations=future operations and little ability to trade off actions in maintenance or operations in the current period for those of future periods where optimal interventions may be made such as maintenance, assignment, duty limitations, through time, having the benefit of far more accurate starting conditions afforded by the true-up.

FIG. 7 illustrates generally an example of portions of a first APM 700. As further described herein, one or more portions of an APM may reside in an asset cloud computing system 720, in a local or sandboxed environment, or may be distributed across multiple locations or devices. An APM may be configured to perform any one or more of data acquisition, data analysis, or data exchange with local or remote assets, or with other task-specific processing devices.

The first APM 700 may include a first asset community 702 that may be communicatively coupled with the asset cloud computing system 720. A plurality of assets 702, 703 may be subject to state estimation at one or more multiple time intervals. Within a given industrial system, there may be estimations of state for more than one system r subsystem such as a blade of a wind turbine 701 or gear 704 associated with the turbine 701. These sub-systems may be combined to estimate the state of damage and performance for an integrated system such as, for example, a windmill, an aircraft engine, a power plant and a train. Other suitable integrated systems may be used. In an example, a machine module 710 receives information from, or senses information about, at least one asset member of the first asset community 702, and configures the received information for exchange with the asset cloud computing system 720. In an example, the machine module 710 is coupled to the asset cloud computing system 720 or to an enterprise computing system 730 via a communication gateway 705.

In an example, the communication gateway 705 includes or uses a wired or wireless communication channel that may extend at least from the machine module 710 to the asset cloud computing system 720. The asset cloud computing system 720 includes several layers. In an example, the asset cloud computing system 720 includes at least a data infrastructure layer, a cloud foundry layer, and modules for providing various functions. In the example of FIG. 7, the asset cloud computing system 720 includes an asset module 721, an analytics module 722, a data acquisition module 723, a data security module 724, and an operations module 725. Each of the modules 721-725 includes or uses a dedicated circuit, or instructions for operating a general purpose processor circuit, to perform the respective functions. In an example, the modules 721-725 are communicatively coupled in the asset cloud computing system 720 such that information from one module may be shared with another. In an example, the modules 721-725 are co-located at a designated datacenter or other facility, or the modules 721-725 can be distributed across multiple different locations.

An interface device 740 may be configured for data communication with one or more of the machine module 710, the gateway 705, or the asset cloud computing system 720. The interface device 740 may be used to monitor or control one or more assets. In an example, information about the first asset community 702 is presented to an operator at the interface device 740. The information about the first asset community 702 may include information from the machine module 710, or the information may include information from the asset cloud computing system 720. In an example, the information from the asset cloud computing system 720 may include information about the first asset community 702 in the context of multiple other similar or dissimilar assets, and the interface device 740 may include options for optimizing one or more members of the first asset community 702 based on analytics performed at the asset cloud computing system 720.

In an example, an operator selects a parameter update for the first wind turbine 701 using the interface device 740, and the parameter update is pushed to the first wind turbine via one or more of the asset cloud computing system 720, the gateway 705, and the machine module 710. In an example, the interface device 740 is in data communication with the enterprise computing system 730 and the interface device 740 provides an operation with enterprise-wide data about the first asset community 702 in the context of other business or process data. For example, choices with respect to asset optimization may be presented to an operator in the context of available or forecasted raw material supplies or fuel costs. In an example, choices with respect to asset optimization may be presented to an operator in the context of a process flow to identify how efficiency gains or losses at one asset may impact other assets. In an example, one or more choices described herein as being presented to a user or operator may alternatively be made automatically by a processor circuit according to earlier-specified or programmed operational parameters. In an example, the processor circuit may be located at one or more of the interface device 740, the asset cloud computing system 720, the enterprise computing system 730, or elsewhere.

Returning again to the example of FIG. 7 some capabilities of the first APM 700 are illustrated. The example of FIG. 7 includes the first asset community 702 with multiple wind turbine assets, including the first wind turbine 701. Wind turbines are used in some examples herein as non-limiting examples of a type of industrial asset that can be a part of, or in data communication with, the first AMP 700.

In an example, the multiple turbine members of the asset community 702 include assets from different manufacturers or vintages. The multiple turbine members of the asset community 702 may belong to one or more different asset communities, and the asset communities may be located locally or remotely from one another. For example, the members of the asset community 702 may be co-located on a single wind farm, or the members may be geographically distributed across multiple different farms. In an example, the multiple turbine members of the asset community 702 may be in use (or non-use) under similar or dissimilar environmental conditions, or may have one or more other common or distinguishing characteristics.

FIG. 7 further includes the device gateway 705 configured to couple the first asset community 702 to the asset cloud computing system 720. The device gateway 705 may further couple the asset cloud computing system 720 to one or more other assets or asset communities, to the enterprise computing system 730, or to one or more other devices. The first AMP 700 thus represents a scalable industrial solution that extends from a physical or virtual asset (e.g., the first wind turbine 701) to a remote asset cloud computing system 720. The asset cloud computing system 720 optionally includes a local, system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 724 in the asset cloud computing system 720. In an example, an external sensor may be used to sense information about a function of an asset, or to sense information about an environment condition at or near an asset. The external sensor may be configured for data communication with the device gateway 705 and the data acquisition module 724, and the asset cloud computing system 720 may be configured to use the sensor information in its analysis of one or more assets, such as using the analytics module 722.

In an example, the first AMP 700 may use the asset cloud computing system 720 to retrieve an operational model for the first wind turbine 701, such as using the asset module 721. The model may be stored locally in the asset cloud computing system 720, or the model may be stored at the enterprise computing system 730, or the model may be stored elsewhere. The asset cloud computing system 720 may use the analytics module 722 to apply information received about the first wind turbine 701 or its operating conditions (e.g., received via the device gateway 705) to or with the retrieved operational model. Using a result from the analytics module 722, the operational model may optionally be updated, such as for subsequent use in optimizing the first wind turbine 701 or one or more other assets, such as one or more assets in the same or different asset community. For example, information about the first wind turbine 701 may be analyzed at the asset cloud computing system 720 to inform selection of an operating parameter for a remotely located second wind turbine that belongs to a different second asset community.

The first AMP 700 includes a machine module 710. The machine module 710 may include a software layer configured for communication with one or more industrial assets and the asset cloud computing system 720. In an example, the machine module 710 may be configured to run an application locally at an asset, such as at the first wind turbine 701. The machine module 710 may be configured for use with, or installed on, gateways, industrial controllers, sensors, and other components. In an example, the machine module 710 includes a hardware circuit with a processor that is configured to execute software instructions to receive information about an asset, optionally process or apply the received information, and then selectively transmit the same or different information to the asset cloud computing system 720.

In an example, the asset cloud computing system 720 may include the operations module 725. The operations module 725 may include services that developers may use to build or test Industrial Internet applications, or the operations module 725 may include services to implement Industrial Internet applications, such as in coordination with one or more other AMP modules. In an example, the operations module 725 includes a microservices marketplace where developers may publish their services and/or retrieve services from third parties. The operations module 725 can include a development framework for communicating with various available services or modules. The development framework may offer developers a consistent look and feel and a contextual user experience in web or mobile applications.

In an example, an AMP may further include a connectivity module. The connectivity module may optionally be used where a direct connection to the cloud is unavailable. For example, a connectivity module may be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 705 between the machine module 710 and the asset cloud computing system 720.

In an example, an AMP may be configured to aid in optimizing operations or preparing or executing predictive maintenance for industrial assets. An AMP may leverage multiple platform components to predict problem conditions and conduct preventative maintenance, thereby reducing unplanned downtimes in the near term or through time by intentional intervention. In an example, the machine module 710 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 710 or at the asset cloud computing system 720, one embodiment having the analytic being a discrete event simulator which changes the exogenous conditions (e.g. weather) and control points, maintenance events, work-scopes and locations, runs replications and computes confidence intervals and contribution to variance over one or more time intervals. In another embodiment, the analytic being a dynamic programming modality. In another embodiment, the analytic being a Monte-Carlo modality.

In response to the detected error conditions, the AMP may issue various mitigating commands to the asset, such as via the machine module 710, for manual or automatic implementation at the asset. In an example, the AMP may provide a shut-down command to the asset in response to a detected error condition. Shutting down an asset before an error condition becomes fatal may help to mitigate potential losses or to reduce damage to the asset or its surroundings. In addition to such an edge-level application, the machine module 710 may communicate asset information to the asset cloud computing system 720.

In an example, the asset cloud computing system 720 may store or retrieve operational data for multiple similar assets. Over time, data scientists or machine learning may identify patterns and, based on the patterns, may create improved physics-based analytical models for identifying or mitigating issues at a particular asset or asset type. The improved analytics may be pushed back to all or a subset of the assets, such as via multiple respective machine modules 710, to effectively and efficiently improve performance of designated (e.g., similarly-situated) assets.

In an example, the asset cloud computing system 720 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration may be useful when an application requires an underlying hardware configuration. The provisioning management and pooling of resources may be done at a granular level, thus allowing optimal resource allocation.

In a further example, the asset cloud computing system 720 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The asset cloud computing system 720 may include a data services module that may facilitate application development.

For example, the data services module may enable developers to bring data into the asset cloud computing system 720 and to make such data available for various applications, such as applications that execute at the cloud, at a machine module, or at an asset or other location. In an example, the data services module may be configured to cleanse, merge, or map data before ultimately storing it in an appropriate data store, for example, at the asset cloud computing system 720. A special emphasis has been placed on time series data, as it is the data format that most sensors use.

Security may be a concern for data services that deal in data exchange between the asset cloud computing system 720 and one or more assets or other components. Some options for securing data transmissions include using Virtual Private Networks (VPN) or an SSL/TLS model. In an example, the first AMP 700 may support two-way TLS, such as between a machine module and the security module 724. In an example, two-way TLS may not be supported, and the security module 724 may treat client devices as OAuth users. For example, the security module 724 may allow enrollment of an asset (or other device) as an OAuth client and transparently use OAuth access tokens to send data to protected endpoints.

A plurality of assets 702, 703 may be subject to state estimation at one or multiple time intervals. Within a given industrial system, there may be estimations of state for more than one system or sub-system such as the blade 701 or the gear 704. These subsystems may be combined to estimate the state of damage and performance for an integrated system such as a windmill or aircraft engine or power plant or train.

Turning to FIG. 8, a creation of a control action 800 for a future time is provided according to one or more embodiments. In one or more embodiments, the control action 800 may be based on historical past true-ups (e.g., rate of change of past true-ups), and may optimize a sequence of true-ups. The control action 800, in one or more embodiments, may schedule a place-holder for a physical inspection, which may be canceled at a later date, if proved unnecessary. The inventors note that scheduling the place-holder may be beneficial in that operational use of the asset(s) may be such that an unscheduled physical inspection may be too costly and/or infeasible.

The inventors note that the estimation of state and the specificity of state may change through time as a result of improved model precision and/or use of the assets which typically degrade life or performance with use. With both improved model precision and/or use of the assets, there may be a progression of accuracy estimation (e.g., 801-810) which may proceed through time and observations. As shown in the graph 801, initially there may be a damage or performance estimate which may be equally probable through a metric of use (e.g., time, cycles, load, etc.). This estimate may be for a single asset or sub-system at a single point of time. In one or more embodiments, a current damage and/or performance state at the time of sensing may be received, and this current-time high-accuracy state may be set as an initial condition in a simulation (e.g., the digital twin 109).

In one or more embodiments, operational set-points of the digital twin 109 may be changed, producing simulated future damage and performance state estimations for one or more operating and/or design modification scenarios. The scenarios may be replicated, in one or more embodiments, and the confidence intervals of future simulated system states may be estimated. In response to the digital twin's 109 future state estimates, the precise control interventions into the current time period may be enabled that may differentially consume life and performance of the asset in the current time period for the optimal future realization of the digital twin's 109 operation, subject to the model error or confidence intervals of the simulated future.

For example, an exemplary estimate improvement may be made, as shown in graph 803, by the inclusion of two assets whose behavior may enable a "best case," "most likely," and "worst case" estimate, for example. In one or more embodiments, the inclusion of a plurality of observable assets and systems over time, as shown in the graph 805, may enable a truer estimate of state, compared to observation of a single asset at a single point in time. The use of many assets through much time and operation conditions may improve state estimation to a limit of specificity, as shown in graph 807, for example, according to one or more embodiments. In one or more embodiments, these estimates may be integrated to form cumulative probabilities, as shown in graph 810, of the damage or performance metric of interest, as well as a rate of change 811 of state estimation change with respect to a change in probability or metric value as a function of time or other causal factor (e.g., usage, load, maintenance, environmental conditions, etc.). In one or more embodiments, the rate of change 811 of at least one of precision and degradation may be used in forecasting when a true-up may be ideally called for and scheduled in the future. In one or more embodiments, the true-up event may be scheduled into an operating profile of the one or more assets of the system 700. In one non-exhaustive example, a certain inspection on a certain component of an aircraft engine may be scheduled in a way that the aircraft may be made available for the inspection and crews may be assigned to that event. As another non-exhaustive example, the engine may be cycled in a way at a certain point in time such that the operations are minimally impacted or the conditions to recover the asset's operations are robust.

As part of the control action 800, a schedule 830 may be generated with operating durations 832 and 842 set as a function of the rate of change of state change 811. As a non-exhaustive example, duration 832 may be an estimated threshold trigger point for an inspection. An inspection of measurement event is scheduled 833 for the establishment of a current estimate 834 at a point in future time. In a first scenario 831, the rate of change of measurement specificity 811 is calculated, and the desired specificity 445 for one action versus another falls below the threshold at duration 832. As added precision (e.g., 801, 803, 805 and 807) is caused by observing more assets, operations and time intervals and/or that results from the fusion of state estimation analytics 455 (FIG. 4), the operating period before inspection may be changed 842, compared to the originally estimated threshold trigger point 832, may result in a change in schedule control action or state data acquisition. The first scheduled action 833 may be dynamically rescheduled or dropped accordingly.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 610 (FIG. 6). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system comprising:
an installed product, including a plurality of components;
a computer programmed with a damage metric model for the installed product, the damage metric model for providing an estimate of an extent of damage on one or more components; the computer programmed with a dynamic process control model for providing a dynamic response of the installed product based on one or more operating parameters of the installed product; the computer further programmed with a true-up model for providing a control action to reduce an uncertainty of the estimate provided by the damage metric model;
the computer including a processor and a memory in communication with the processor, the memory storing the damage metric model and the true-up model; the memory storing additional program instructions, the processor operative with the additional program instructions to perform functions as follows:
receiving an estimate output of the damage metric model, wherein the output includes the estimate of the extent of damage on the one or more components;
determining an uncertainty value associated with the output estimate of the extent of damage on the one or more components;
generating, via the dynamic process control model, an operating response of the installed product to the received estimate output;
in response to receipt of the estimate output, executing the true-up model; and
generating, via execution of the true-up model, a plan to reduce the determined uncertainty value of the output estimate of the extent of damage on the one or more components;
wherein the control action is an automated perturbation of the installed product.

2. The system of claim 1, wherein the computer is programmed with a performance metric model for generating an estimate of system-level operating performance on at least one of one or more asset and one or more coupled systems; and wherein the computer is further programmed with the true-up model for generating the plan to reduce an uncertainty of the estimate of system-level operating performance provided by the performance metric model.

3. The system of claim 1, wherein the processor is further operative with the additional program instructions to perform functions as follows:
executing the control action.

4. The system of claim 1, wherein the control action includes execution of an in-operation test sequence associated with the one or more components, or execution of an in-operation data burst associated with the one or more components, wherein each of the in-operation test sequence and the in-operation data burst is executed while the one or more components are in operation.

5. The system of claim 1, wherein a sequence and use of true-up modalities are computed to maximize a specificity required for operational control at a desired confidence interval at one or more intervals of time.

6. The system of claim 1, wherein the estimate of the extent of damage is for one or more sub-components of the one or more components.

7. The system of claim 1, wherein the estimate of the extent of damage is for one or more assets in a process or system.

8. The system of claim 1, wherein the processor is further operative with the additional program instructions to perform functions as follows:
determining that the uncertainty value is too high prior to executing the true-up model.

9. The system of claim 6, wherein the processor is further operative with the additional program instructions to perform functions as follows:
determining a first uncertainty associated with the estimate output for each of the one or more sub-components;

and identifying one or more estimate outputs to reduce uncertainty via execution of the true-up model.

10. The system of claim 9, wherein the processor is further operative with the additional program instructions to perform functions as follows:
quantifying an amount of uncertainty reduction for each of the identified one or more estimate outputs.

11. The system of claim 10, wherein execution of the control action further comprises,
generating an in-operation test sequence method or an in-operation data burst method; and
determining a second uncertainty associated with the in-operation test sequence method or the in-operation data burst method.

12. The system of claim 11, wherein generating the control action to reduce the uncertainty of the estimate output is based on the determined second uncertainty.

13. The system of claim 8, wherein determining the uncertainty is too high is based on a non-damage related metric.

14. The system of claim 13, wherein the determined uncertainty is based on an aggregate of two or more uncertainties, each associated with the estimate of the extent of damage associated with the component.

15. The system of claim 14, further comprising:
determining an effect of each of two or more uncertainties on the aggregate uncertainty.

16. The system of claim 15, further comprising:
based on a determination that a first one of the two or more uncertainties affects the aggregate uncertainty more than at least a second one of the two or more uncertainties, executing the true-up model to true-up the estimate output associated with the first uncertainty.

* * * * *